S. TAYLOR.
Bee Hive.
No. 58,696.
Patented Oct. 9, 1866.
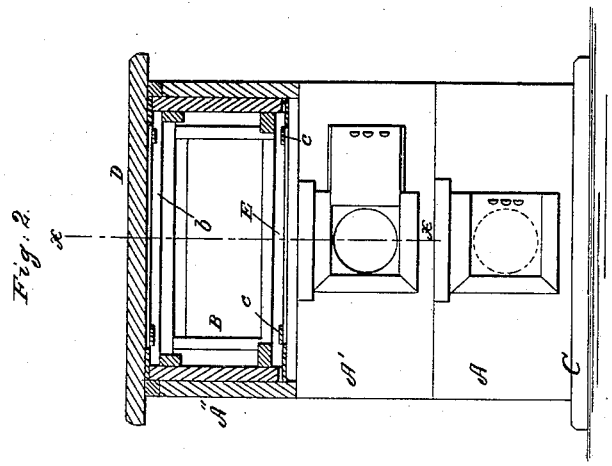
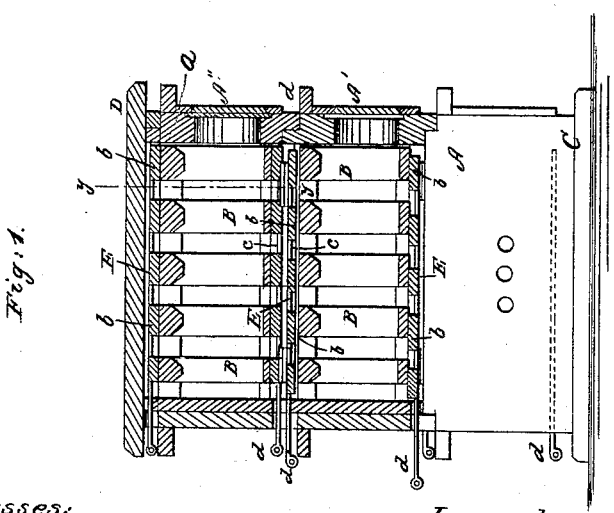

UNITED STATES PATENT OFFICE.

SAMUEL TAYLOR, OF BURLINGTON, MAINE.

IMPROVEMENT IN BEE-HIVES.

Specification forming part of Letters Patent No. 58,696, dated October 9, 1866.

*To all whom it may concern:*

Be it known that I, SAMUEL TAYLOR, of Burlington, in the county of Penobscot and State of Maine, have invented a new and Improved Bee-Hive; and I do hereby declare that the following is a full, clear, and exact description thereof, which will enable others skilled in the art to make and use the same, reference being had to the accompanying drawings, forming part of this specification, in which—

Figure 1 is a vertical section of my invention, taken in the line $x\ x$, Fig. 2; Fig. 2, a vertical section of the same, taken in the line $y\ y$, Fig. 1.

Similar letters of reference indicate like parts.

This invention consists in constructing the bee-hive in sections, so arranged and connected together that any one of the sections may be removed at pleasure, and the sections arranged or disposed as may be required, in order to take all the surplus honey from the hive the colony of bees can spare without killing or injuring the bees in the least, the invention also admitting of old combs being removed whenever necessary.

In the accompanying drawings the hive is represented as being composed of three sections, A A' A'', placed one above the other, and fitted together by having the inner part of the lower end of an upper section rabbeted, as shown at $a$, to receive a ledge, $b$, on the inner part of the top of an under section, which ledge is formed by rabbeting the outer part of said top, as shown at $c$, the rabbet $c$ receiving a ledge, $d$, on the lower end of the upper section, the ledge $d$ being formed by the rabbet $a$. (See Fig. 1.) These sections are all provided with vertical comb-frames B, of the usual or any proper construction, and the lower section, A, rests upon a base, C, and the upper section, A'', provided with a suitable cap, D.

Between the sections there are placed sliding frames E, composed of a series of parallel slats, $b$, connected at a suitable distance apart by bars $c$ near their ends. These frames E are provided with handles or rods $d$, which extend through one side of the sections, to admit of the frames E being moved or adjusted. These frames E admit of communication between the sections being made and shut off whenever required, one frame being fitted in the upper part of a lower section, and the other in the lower part of a section above, each section having a frame at its top and bottom, to admit not only of a communication being formed and cut off between the sections, but also to admit of each section, when removed from the hive, being closed at top and bottom.

By this arrangement it will be seen that any of the sections may be removed from the hive by simply adjusting the frames E so as to close the top and bottom of the sections, and when a filled section is thus removed an empty one may be put in its place, or the bees allowed to escape from the detached section by putting it in a dark room having a lighted opening, to which the bees will be attracted and pass out, the sliding frame E at the top of said section being adjusted to admit of the bees passing out from said section. The honey may then be removed from the section by detaching one of the frames E, and then replaced on the hive. Thus it will be seen that by having the hive composed of detachable or removable sections provided with sliding frames, as shown, the sections may be readily detached with the bees confined within them, and the honey removed without any difficulty whatever, and without the liability of the operator being stung.

I do not claim, broadly, a bee-hive made in sections, for that is an old device; but I do claim as new and desire to secure by Letters Patent—

A bee-hive constructed of a series of sections, A A' A'', in combination with sliding frames E, applied or fitted to the sections, and constructed substantially in the manner shown and described, for the purpose set forth.

SAMUEL TAYLOR.

Witnesses:
JEREMIAH PAGE,
THEODORE TAYLOR.